Dec. 8, 1964  F. J. GARVEY  3,159,888
SPRING CLAMP FOR MOLD PARTS AND THE LIKE
Filed March 26, 1962
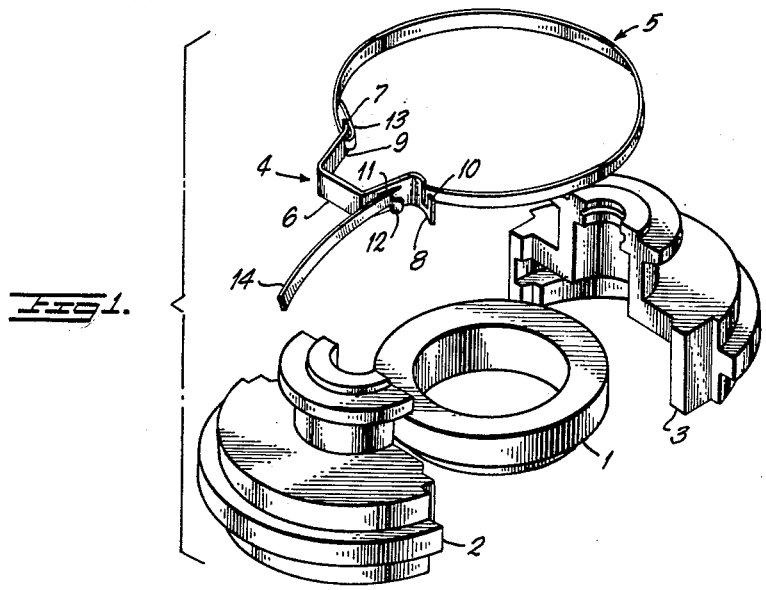
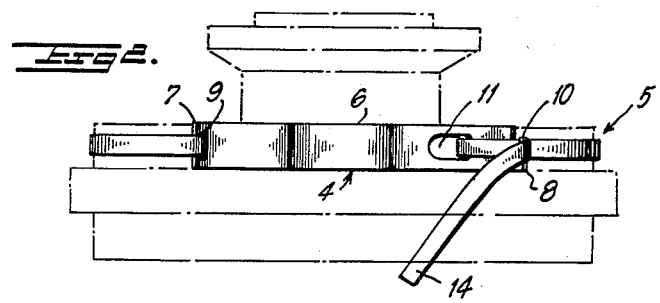
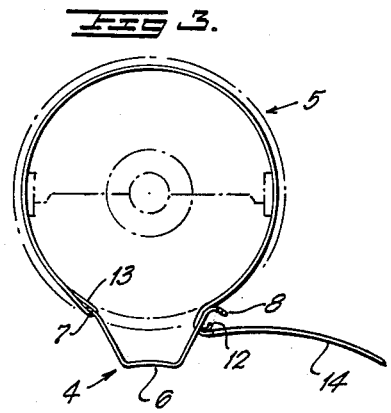
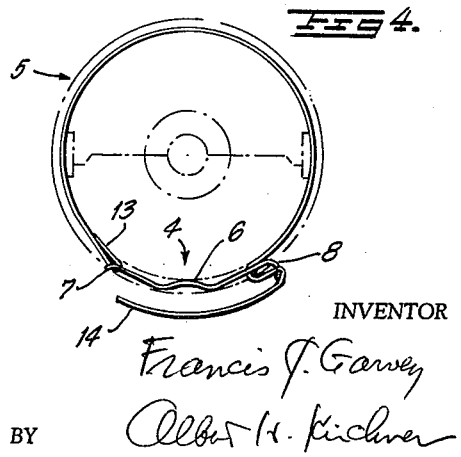
INVENTOR
Francis J. Garvey
BY Albert H. Kirchner
ATTORNEY United States Patent Office 3,159,888
Patented Dec. 8, 1964

3,159,888
SPRING CLAMP FOR MOLD PARTS
AND THE LIKE
Francis J. Garvey, Blue Anchor, N.J., assignor to Garvey Products Corporation, Blue Anchor, N.J., a corporation of New Jersey
Filed Mar. 26, 1962, Ser. No. 182,427
2 Claims. (Cl. 24—23)

The present invention comprises a clamp, and more particularly it provides a clamping device for temporarily securing together the separate parts of a split neck ring or mold used in the glass industry for forming the necks and adjacent body portions of jars, bottles and the like.

These mold elements are separable heavy metallic elements which are fitted into the cavity-defining members of the mold and are of course of predetermined size and shape suited to the particular jar or bottle that is to be made. They are removable and replaceable for the purpose of converting the molding equipment to produce a bottle or jar (hereinafter for brevity called simply a jar) of different size, shape or design. The mating parts of each split assembly, comprising generally and typically a single complete central ring and a pair of enclosing half-ring elements, must be kept together in handling, storing and transporting; and considerable annoyance, delay and expense are sometimes encountered in the industry because of misplacement of one or another of the separable parts and, more seriously, of damage to them.

It has been customary to tie the parts of a single assembly together when they are taken from the molding equipment by wrapping them with cord or wire, but this has proved to be unsatisfactory as time-consuming in tying and untying and as sometimes introducing nicks and dents into the mating surfaces, and for other reasons.

The principal object of the present invention is to provide a special clamp which can be applied with great ease and facility to an assembly of split neck ring or mold parts so as to hold the parts together securely and safely for handling and which can be as readily removed when the parts are to be installed for use in the mold.

Special objects of the invention are concerned with providing a clamp of the character indicated which will be applicable in a single size to a wide range of mold assembly parts, which will be inexpensive to make and simple and foolproof to use, and which will be durable and long lasting in use.

A preferred embodiment of the invention comprising a clamp that has been thoroughly tested in use and found to be completely satisfactory, and which is accordingly at present preferred, is shown in the accompanying drawing, in which FIGURE 1 is a perspective view of the new clamp in position about to be applied to a three-part split neck ring assembly;

FIG. 2 is a side elevational view of the clamp in operative position on the assembled split ring parts, which are shown in broken lines;

FIG. 3 is a top plan view of the clamp applied to the assembly (shown in broken lines), illustrating the penultimate step in the applying operation; and FIG. 4 is a similar view showing the clamp in final applied position on the assembly.

In these figures the reference numerals 1, 2 and 3 designate the three elements of a conventional neck ring assembly used in molding a glass jar, shown separated so as better to illustrate the individual mating surfaces. It will be understood that it is these three elements that are removed from the mold as a unit and which must be kept together in storage pending their replacement into the mold and which must be protected during storage and handling so as to prevent nicking, denting and other damage to their glass-engaging surfaces. It will also be understood that the most certain way to provide this protection is to maintain the parts assembled with their mating surfaces in mutual contact, and their glass engaging surfaces disposed within the assembly, so that all such surfaces will be spared injury during rough handling, dropping, etc.

This is accomplished by the clamp shown in FIG. 1.

The clamp comprises only two parts: a buckle member 4 and a band member 5.

The buckle member is a short length of elongated resilient strap metal, such as spring steel, formed in the shape shown, i.e., so as to have a central bowed portion 6 prominently bulged outwardly from the plane of the two terminal margins 7 and 8. Adjacent the terminal margin 7 the member is perforated by a completely enclosed opening 9, and the other terminal margin 8 is provided with two openings of different and special design.

The opening nearer to the extreme end of the terminal margin 8 of the buckle member is a slot 10 which is open to one edge of the member, here shown as the top or upper edge. Spaced a short distance inwardly of the member from this slot is the other of the two openings in this terminal margin of the buckle member. This is a hole 11, which is completely enclosed by the metal of the member and is formed by striking out from the metal a tongue 12 the base of which defines the side of the hole nearer to the slot 10. The tongue 12 is bent outwardly in a rounded curve and reversely directed toward the slot, and the extreme end portion of the terminal margin, which contains the slot 10, is bent outwardly, with the portion between the slot and the end edge of the buckle gently curved, all as best shown in FIGS. 1 and 3.

The band 5 is simply a length of pliable metal, such as aluminum alloy or equivalent metallic tape or strip stock which will withstand a great number of bendings without breaking. One end of this band is permanently looped through the completely enclosed opening 9 in the terminal margin 7 of the buckle member. As shown at 13, this loop is best made quite flat, with the free end of the band positioned inwardly, i.e., oppositely directed from the direction in which the bowed portion 6 of the buckle projects, so as to make the connection of the band to the buckle relatively permanent and secure.

The band 5 is provided in ample length to embrace the circumference of the assembled mold parts 1, 2 and 3 with a tail end portion 14 of several inches left over, as shown in the figures.

The manner in which the clamp is used, in applying it to and removing it from the assembly of mold parts, is as follows:

With the mold parts engaged in mating relation, the clamp with the free end portion of the band member 5 projecting through the hole 11 in the buckle member and the intermediate portion of the band arranged in a substantially circular loop of somewhat larger diameter than that of the mold parts assembly, the enlarged loop is dropped over the assembly. The loop is fitted around the periphery of the assembly, with the band engaged with the surface of the parts and the bow of the buckle member protruding in contracted, normal condition as shown in FIG. 3. The tail end portion 14 of the band is then pulled tight over the curved surface of the tongue 12 until the buckle member becomes substantially flattened against the assembly, in the condition shown in FIG. 4. Then the tail end portion of the band is bent around the tongue 12 and lowered edgewise into the slot 10, whereupon the free end of the band extending from the slot may be bent slightly back on itself, as shown in FIG. 4 so as to resist backward movement of the band through the slot and hold the band fixed in the buckle. The flattened condition of the buckle bow exerts tension on the band and thus securely clamps the mold assembly parts together.

Removal is of course easily effected by simply lifting the band out of the slot 10, and then bending the thus freed portion of the band back into substantial alignment with the looped portion so that the band is free to slide back through the hole 11 in response to contraction of the buckle loop 6. The resulting enlargement of the band loop permits the band to be lifted from the parts assembly.

It is to be noted that the rounded curvature of the tongue 12 facilitates sliding of the band across its surface and prevents sharp bending or kinking of the band at the edge of the hole 11, which would result in premature breaking of the band at this point. The same kind of curvature is provided at the extreme end of the terminal margin 8 of the buckle, between the slot 10 and the end edge of the buckle, so that here also sharp bending and kinking of the band is prevented. It has been found that the combined friction of the band on the buckle surfaces at the tongue 12 and in the slot 10 and around the curved surface between the slot and the adjacent end edge of the buckle is adequate to hold the band fixed against the moderate tension induced by the distortion of the bowed portion of the buckle.

Obviously the invention is not limited to the precise details and particular combination of features of the illustrated embodiment, and it is not indispensable that all of these details and features be used conjointly. Various other combinations and variations are contemplated within the spirit of the invention and the scope and purview of the appended claims.

I claim:

1. In a clamp for such purposes as holding together the separate parts of a split neck ring or mold, an elongated buckle member comprising a single thickness of spring strap metal formed in generally U-shape having two opposite terminal bearing portions and an intermediate upwardly bowed portion, a fully enclosed opening in one terminal bearing portion, a transverse slot open to one edge of the member cut beyond the other terminal bearing portion, a hole in the member inwardly of said other terminal bearing portion and adjacent to said slot, and a tongue struck up from the member defining the outer side of said hole and bent back toward said slot, and a pliable metallic band having an intermediate portion adapted to encircle the parts to be clamped and having one end portion looped through said opening and being thereby permanently connected to the buckle member and having its other end portion underlying said other terminal bearing portion of the member, extending up through said hole and reversely bent back over said tongue and extending through the open ended slot, whereby, when the parts to be clamped are enclosed by the buckle member and the intermediate portion of the band, flattening pressure applied to the bowed portion will press the terminal bearing portions against the parts, spread them farther apart and increase the distance between the opening and hole and thereby loosen the clamp and permit more of the band to be pulled through the hole.

thereby increasing the tension in the band and the clamping effect on the enclosed parts upon release of said flattening pressure.

2. A clamp as claimed in claim 1 in which said other terminal bearing portion of the buckle member is bent upwardly and said open ended slot is formed in said upwardly bent portion, whereby the portion of the band which extends through said slot is spaced outwardly from any substantially circular assembly of parts which are enclosed by the band.

References Cited in the file of this patent

UNITED STATES PATENTS

| | | |
|---|---|---|
| 133,349 | Arnold | Nov. 26, 1872 |
| 2,192,979 | McAneny | Mar. 12, 1940 |
| 2,377,224 | Gerrard | May 29, 1945 |
| 2,645,514 | Mitchko | July 14, 1953 |
| 2,931,083 | Sidenmark et al. | Apr. 5, 1960 |

FOREIGN PATENTS

| | | |
|---|---|---|
| 739,173 | France | Oct. 4, 1932 |